United States Patent [19]

Pummer et al.

[11] Patent Number: 5,637,975
[45] Date of Patent: Jun. 10, 1997

[54] POWER FACTOR CORRECTOR FOR A.C. INDUCTION MOTORS

[76] Inventors: Alexander C. Pummer, 4349 Krause St., Pleasanton, Calif. 94588; Dwight D. Burchak, 4236 Warbler Loop, Fremont, Calif. 94555; John E. Powers, 43116 Mission Blvd., Fremont, Calif. 94539

[21] Appl. No.: 343,887

[22] Filed: Nov. 17, 1994

Related U.S. Application Data

[63] Continuation-in-part of Ser. No. 962,136, Oct. 16, 1992, abandoned.

[51] Int. Cl.⁶ .................................................. H02P 1/24
[52] U.S. Cl. ........................................ 318/729; 318/811
[58] Field of Search ............................ 318/438, 729, 318/767, 798–811

[56] References Cited

U.S. PATENT DOCUMENTS

| | | | |
|---|---|---|---|
| 4,052,648 | 10/1977 | Nola | 318/200 |
| 4,417,198 | 11/1983 | Mayfield | 323/315 |
| 4,426,614 | 1/1984 | Nola | 323/243 |
| 4,433,276 | 2/1984 | Nola | 318/729 |
| 4,454,462 | 6/1984 | Spann | 318/729 |
| 4,459,528 | 7/1984 | Nola | 318/729 |
| 4,578,746 | 3/1986 | Gyugyi et al. | 363/161 |
| 4,616,166 | 10/1986 | Cooper et al. | 318/719 X |

*Primary Examiner*—David S. Martin

[57] ABSTRACT

A Power Factor Corrector system for use with AC induction motors which detects information from the motor voltage and motor current and decreases the power input to the motor proportional to the detected phase displacement between the current and voltage resulting in reduced electrical power input to the motor as the mechanical load is decreased.

3 Claims, 5 Drawing Sheets

POWER FACTOR CORRECTOR FOR A.C. INDUCTION MOTORS

CROSS-REFERENCE TO RELATED APPLICATIONS

This application is a continuation-in-part of U.S. Ser. No. 07/962,136 filed Oct. 16, 1992, and now abandoned

BACKGROUND OF THE INVENTION

1. Field of Invention

This invention relates to power factor correction for induction motors and specifically to regulate input power as a function of the mechanical lead.

2. General Description of Prior Art

The induction motor is perhaps the most durable and most commonly used motor. The RPM of the motor runs at a basically constant speed which with in certain limits is independent of the mechanical lead and line voltage. The line voltage is given and is not controllable by the end user. The induction motor through design and specification considers the lowest line voltage for the given mechanical lead. The mechanical lead is variable which requires adjustments of the line voltage for optimum operation of the applied voltage and should be a function of the mechanical lead.

Various attempts have been made to address the aforementioned issues:

U.S. Pat. No. 4,052,648 Inventor Frank J. Nola—This patent addresses the motor input voltage control issue. Nola through circuit design controls the current angle flow cutting out a portion of the sinusoidal motor current once every half period of the 60 cycle line input. The resulting wave form is a distorted sinusoid producing multiple harmonics of the line frequency and high levels of electro magnetic pollution which is transmitted back through utility power lines contaminating the utility system resulting in an undesirable outcome.

U.S. Pat. No. 4,459,528 Inventor Frank J. Nola—This patent addresses the same issues as were addressed in Pat. No. 4,052,648 for the three phase induction motors having the same outcome.

U.S. Pat. Nos. 4,433,276 Inventor Frank J. Nola—This patent addresses the same issues as sited in U.S. Pat. No. 4,052,648 and 4,459,528 however this patent extends the usage to three phase delta motors having the same inherent outcome.—U.S. Pat. No. 4,454,462 Inventor Robert J. Spann—This patent addresses the same issues as sited in Pat. Nos. 4,052.648, 4,459,528 and 4,433,276 however a different sensing method is used. The same inherent outcome results as sited in the Nola patents.

OBJECTIVE OF THE INVENTION

The objective of this invention is to provide an electrical device which when placed in series with the AC induction motor, will reduce the power provided to the motor to an optimum level for a given loading situation. This invention does not however cause harmonic distortion and electromagnetic pollution. The harmonic distortion and electromagnetic pollution is eliminated through a filtering/chopping process. This process employs a motor current chopping method which occurs multiple times in every half period.

SUMMARY OF INVENTION

In accordance with the invention the line voltage and the motor current are sampled. The samples am used to generate phase relationship information between line voltage and motor current. This signal is used to control the multiple chopping of the motor current. The filtering process produces a wave form identical to the input wave form.

BRIEF DESCRIPTION OF THE DRAWINGS

The present invention will be understood more fully from the detailed description given below and from the accompanying drawings of the preferred embodiments of the invention which, however should not be taken to limit the invention to a specific embodiment but are for explanation and understanding only.

FIG. 3 shows only input filter #(101), current switch #(102) and output filter #(103) for each phase of the motor. Of the other components only one of each is used.

FIG. 4 shows only input filter #(101), current switch #(102), output filter #(103) and pulse width modulator #(110) for each phase of the motor. Of the other components only one of each is used.

DETAILED DESCRIPTION OF THE INVENTION

Figure 1:
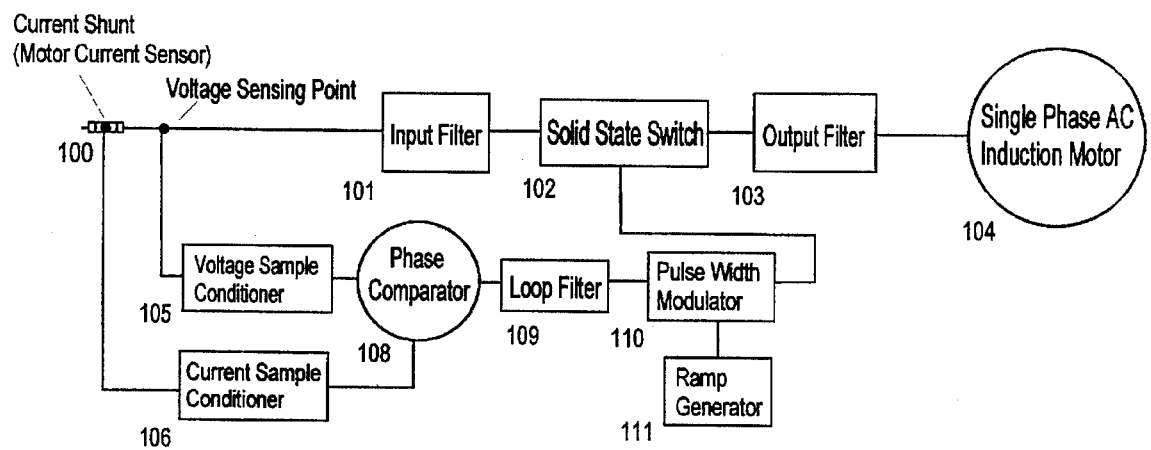
FIG. 1 is a block drawing of the Power Factor Corrector for AC Induction Motors for a single phase motor.

Description of the Embodiment: (Description of FIG. 1)

The single phase induction motor (104) is powered through the input filter (101). The input falter is a low pass filter designed to provide the required attenuation for the chopping frequency and its harmonics. The next component is the current switch (102), which consists of solid state switching devices and controls the power flow between the power line and the motor. The current switch is two current path device. Only one path is on at one time. When the main path is on the current flows from the power line to the motor winding. When the auxilary path is on the motor winding is disconnected from the line and connected to the neutral or return line. The power switch is followed by the output filter (103), which has the same construction parameters as the above mentioned input filter. The input line current is sampled at the shunt (100) and is fed into the current sample conditioner (106) which is made up of a buffer in series with a 90 degree phase shifter. The phase shifted current from the output of the current sample conditioner (106) is a square wave whose zero crossing is 90 degrees phase shifted relative to the zero crossing of the sinusoidal input wave form. The voltage, sampled as a phase reference is sampled at the input of the input filter (101) and fed into the voltage sample conditioner (105). The output of the voltage sample conditioner (105) is square wave whose zero crossing is identical to the zero crossing of the sinusoidal input wave form. The outputs of conditioners (105) & (106) are fed into phase comparator (108). The phase comparator (108) detects the phase difference between the two input square waves. The output of the phase detector are pulses, the integrated area of which is proportional to the detected phase difference of its input signals. These pulses are fed into loop filter (109) which integrates the pulses to a dc level proportional to the integral of the input pulse. A zero degree phase difference between line input current and line input voltage will result in a 90 degree phase difference at the input of the phase comparator (108) and will also result in a zero volt dc level at the output of the loop filter (109). This loop filter is designed to rules of closed loop system theory. Its function in addition to being an integrator is to define the characteristics of the closed loop. Loop filter (109) output is feed into the pulse width modulator (110). The pulse width modulator (110) uses the dc level from the output of the loop filter (109) to control the duty cycle of the current switch (102). The ramp generator (111) provides a ramp to the pulse width modulator (110) for the purpose of establishing the duty cycle of the current switch (102). The frequency of the ramp is the chopping of the Power Factor Corrector system. The lower theoretical limit of this frequency is 2p times (6.28 . . . ) the AC line frequency. The upper frequency limit is defined by the switching speed of the current switch (102). For practical reasons of the filter design it desired to use as high a frequency as possible. The output of the Pulse Width Modulator (110) provides control pulses which vary in length as a function of the mechanical load of motor (104). The current switch (102) is used to control the power flow by chopping the power to the A.C. induction motor (104).

Figure 2:
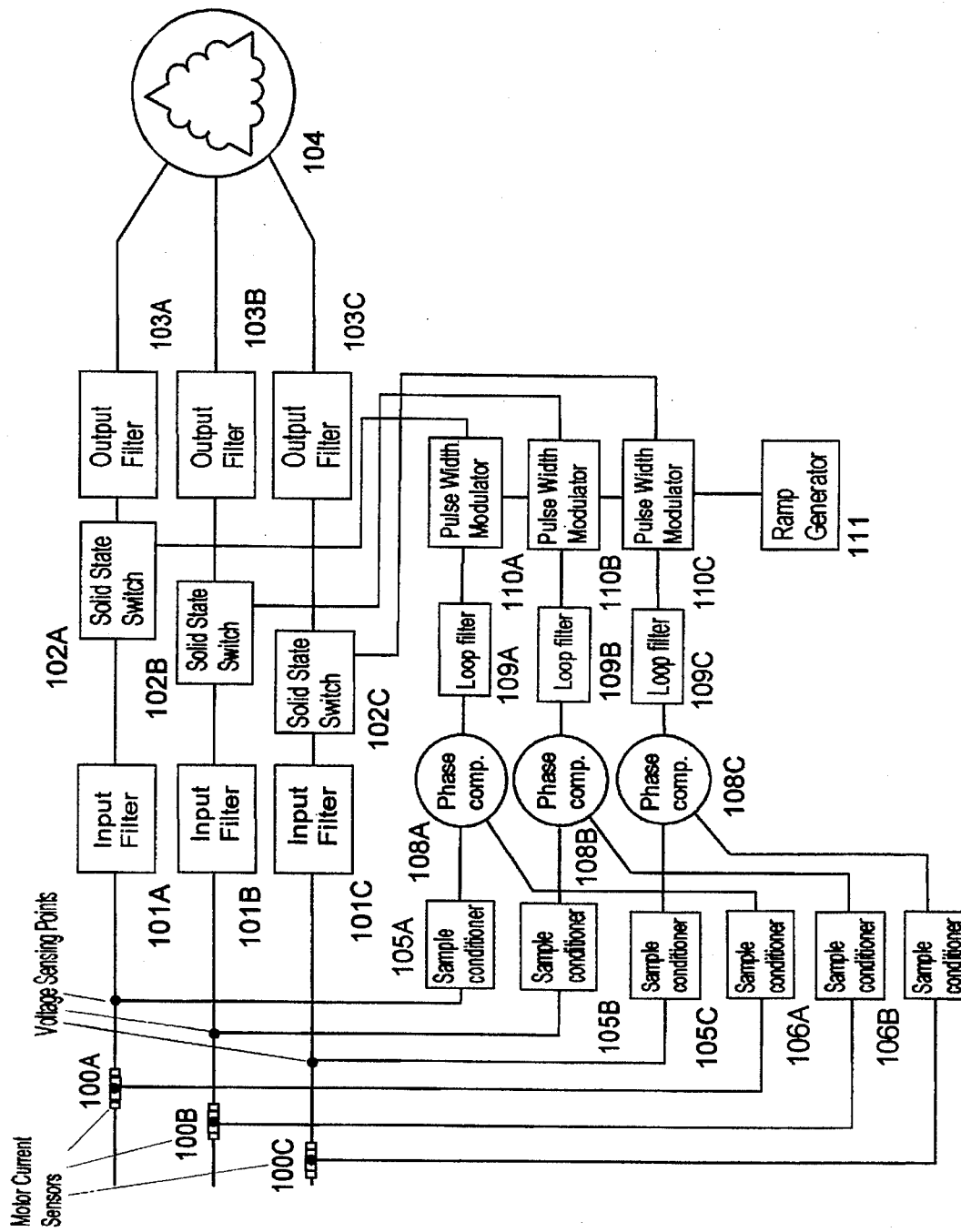
FIG. 2 is a drawing showing the application of the invention to a three phase motor. For the three phase motor in FIG. 2 all of the components including the #(100) the current shunt, #(101) the input filter, #(102) the current switch, #(103) the output filter, #(105) the voltage sample conditioner, #(106) the current sample conditioner, #(108) the phase comparator, #(109) the loop filter, and #(110) the pulse width modulator are increased to three from the single phase motor in FIG. 1.
Figure 3:
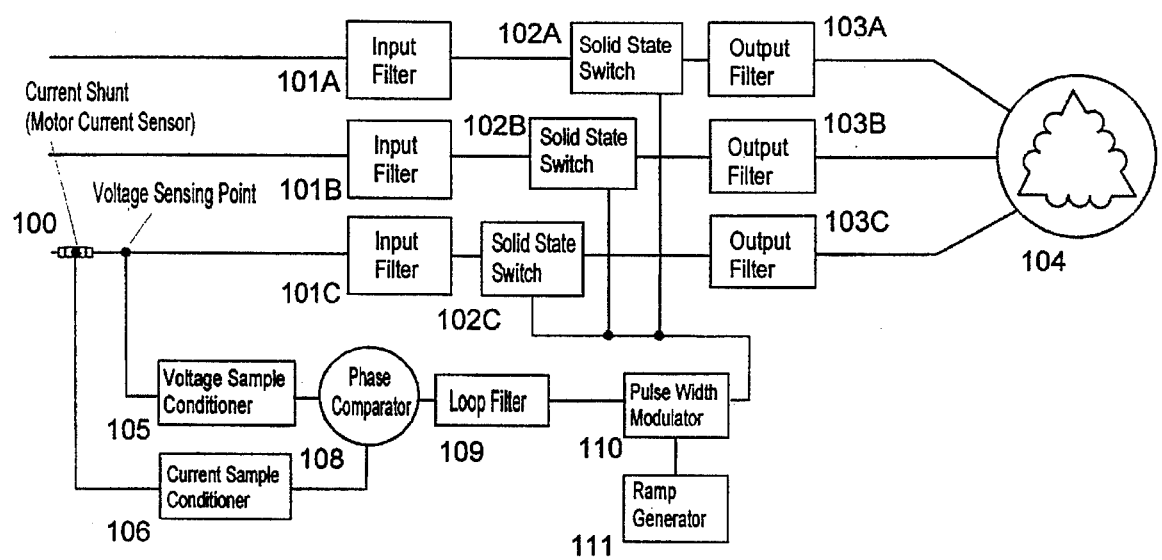
FIG. 3 is a drawing showing the application of the invention to a three phase motor.
Figure 4:
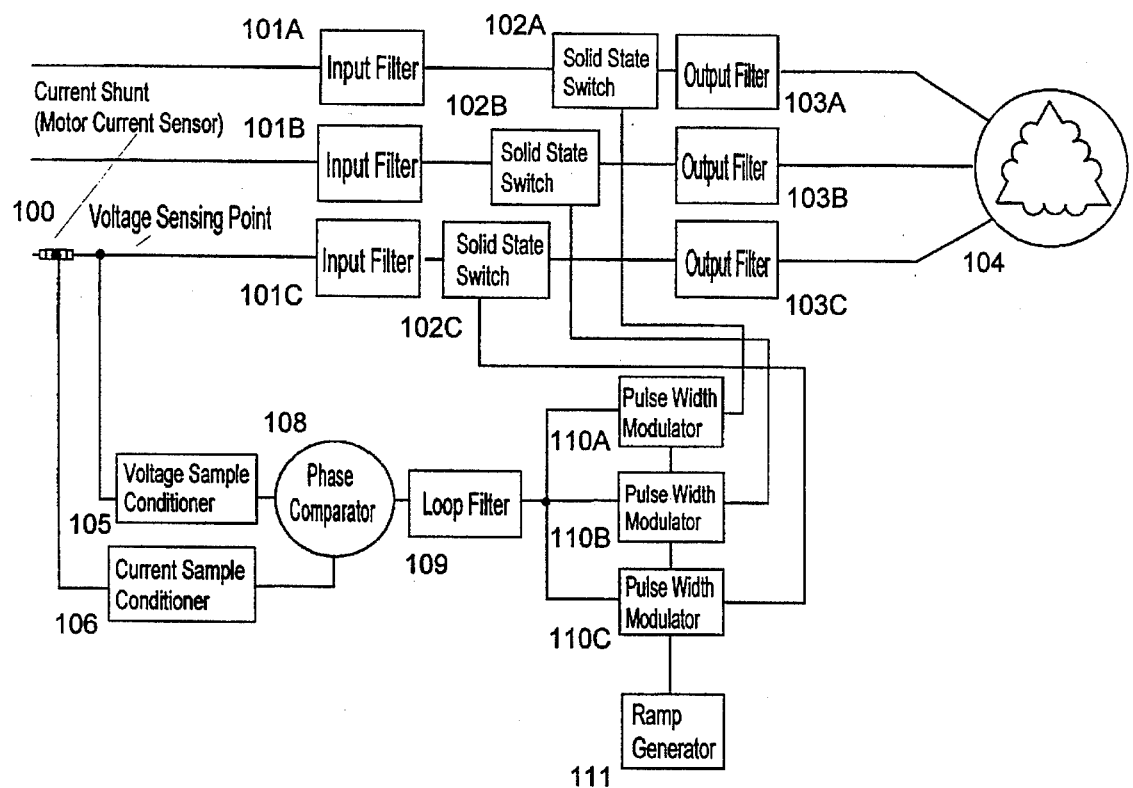
FIG. 4 is a drawing showing the application of the invention to a three phase motor.
Figure 5A:
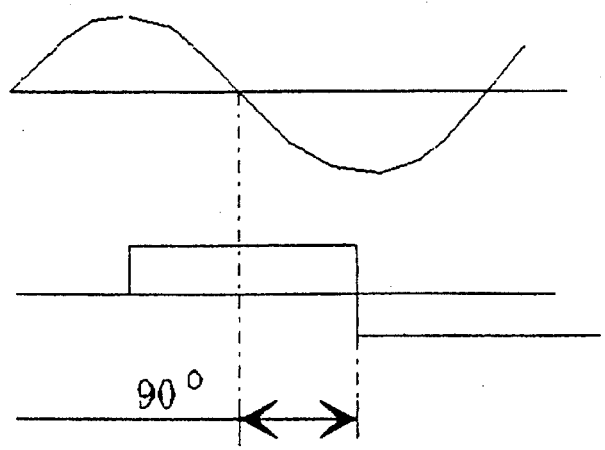
FIG. 5a shows the sinusoidal voltage input to voltage sample conditioner #(105) and the corresponding square wave output at 90° phase shift.
Figure 5B:
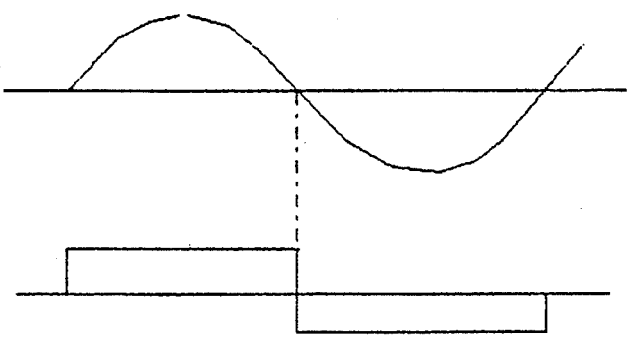
FIG. 5b shows the sinusoidal current input to the current sample conditioner #(106) and the corresponding square wave output in phase with the input waveform.
Figure 5C:
FIG. 5c shows the output of the pulse width modulator #(108) being fed into the current switch #(102). This signal is being used for the chopping signal.
Figure 5D:
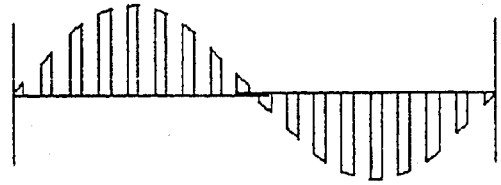
FIG. 5d shows the output of the current switch #(102) with the chopped sinusoidal waveform.

While the invention illustrated herein is shown as being usable with a single phase device, it may be connected in circuit with each phase of a multi-stage induction motor. FIGS. 2, 3 and 4 illustrate different methods of connecting the invention to different blocs of A.C. induction motors. The same numerals represent the same parts for the system in FIGS. 2–4 as that shown in FIG. 1. FIG. 2 shows the application of FIG. 1 to a three phase motor. All components, except the ramp generator 111 are repeated as three separate devices, one for each phase respectively. FIG. 3 shows only the use of multiple phase parts for the input filter (101), the output filter (103), and the current switch (102). FIG. 4 shows only the use of multiple phase parts for the input filter (101), the output filter (103), the current switch (102), and the pulse width modulator (110).

We claim:

1. A Power Factor Corrector System for an AC induction motor using multiple chopping of the input current during one period of the AC line frequency, comprising:

current sampling means in circuit with each phase winding of a said motor for providing an AC output signal in phase with the current through each phase said winding;

voltage sampling means for sensing the voltage of an electrical input applied to said each phase winding and for providing an output signal in phase with said voltage across said each phase winding;

phase detection means responsive to the outputs of said current sampling means and said voltage sampling means for providing output pulses which vary in accordance with the difference in phase between said AC output signal and said output signal; and a loop filter means responsive to the output of said phase detection means for providing a dc level proportional to an integrated value of said pulses provided by said phase detector; and a ramp generator means generating a linear ramp with a repetition frequency this frequency being a chopping frequency;

a pulse width modulator means responsive to the output of said loop filter means and said ramp generator means for generating pulses with a duty cycle established as a function of said inputs; and, an input filter means and an output filter means with a fixed cut-off frequency which attenuate said chopping frequency and any related by products from affecting said each of said phase winding winding and said input line; and a current switch responsive to the output of said pulse width modulator controlling the current of said each phase winding;

a control means electrically connected in series with each said phase winding of said motor, and responsive to the output of said phase detection means for varying the duty cycle of each cycle of each period of the chopping frequency to said winding inversely proportional to the difference in phase between said current and said voltage;

whereby an increase in difference between the magnitude of said voltage and the magnitude of load applied to said motor is compensated for by a reduction in power to said motor, improving its efficiency.

2. A control system as set forth in claim 1 wherein said current sampling means includes a current transformer wherein the primary winding of the current transformer is to be placed in series with said each phase winding of said motor and means of providing a signal with phase information of the primary current.

3. A control system as set forth in claim 2 wherein said control means includes:

chopping means placed in circuit with said each phase winding of said motor and responsive to said pulse width modulator for varying average value of said winding current by controlling said duty cycle of said chopping frequency.

* * * * *